United States Patent
Haevescher

(10) Patent No.: US 8,607,657 B2
(45) Date of Patent: Dec. 17, 2013

(54) ACTUATION DEVICE WITH HAPTIC EMULATION

(75) Inventor: Rainer Haevescher, Stemwede (DE)

(73) Assignee: Lemforder Electronic GmbH, Espelkamp (DE)

( * ) Notice: Subject to any disclaimer, the term of this patent is extended or adjusted under 35 U.S.C. 154(b) by 273 days.

(21) Appl. No.: 12/883,258

(22) Filed: Sep. 16, 2010

(65) Prior Publication Data

US 2011/0005344 A1  Jan. 13, 2011

Related U.S. Application Data

(63) Continuation of application No. PCT/DE2009/000295, filed on Mar. 5, 2009.

(30) Foreign Application Priority Data

Mar. 26, 2008 (DE) .......................... 10 2008 015 874

(51) Int. Cl.
*B60K 17/04* (2006.01)

(52) U.S. Cl.
USPC .................................... 74/473.12; 74/473.14

(58) Field of Classification Search
USPC ................. 74/473.12, 473.1, 473.14, 473.19, 74/473.23, 473.24, 473.25
See application file for complete search history.

(56) References Cited

U.S. PATENT DOCUMENTS

| | | | |
|---|---|---|---|
| 5,059,882 A * | 10/1991 | Marcillat et al. ............... | 318/675 |
| 5,735,490 A * | 4/1998 | Berthet et al. .................. | 244/223 |
| 6,918,314 B2 * | 7/2005 | Wang .............................. | 74/335 |
| 7,237,450 B2 * | 7/2007 | Ogasawara et al. ........ | 74/473.12 |
| 7,334,497 B2 * | 2/2008 | Giefer et al. ............... | 74/473.12 |
| 7,614,319 B2 * | 11/2009 | Hermansson et al. ..... | 74/473.12 |
| 2002/0148318 A1 | 10/2002 | Giefer et al. | |
| 2004/0076509 A1 * | 4/2004 | Steinborn ........................ | 415/13 |
| 2005/0028632 A1 * | 2/2005 | Giefer et al. ................. | 74/473.1 |
| 2005/0239596 A1 * | 10/2005 | Giefer et al. .................... | 477/96 |
| 2006/0283279 A1 * | 12/2006 | Levin et al. ............... | 74/471 XY |
| 2008/0078604 A1 * | 4/2008 | Ersoy et al. .................... | 180/336 |
| 2009/0030583 A1 * | 1/2009 | Shimamura et al. ............ | 701/55 |
| 2009/0193923 A1 * | 8/2009 | Nakai et al. ................ | 74/473.12 |

FOREIGN PATENT DOCUMENTS

| | | |
|---|---|---|
| DE | 198 48 191 A1 | 4/2000 |
| DE | 100 03 796 C2 | 8/2001 |
| DE | 10 2004 056 800 A1 | 6/2006 |
| DE | 10 2005 021 977 A1 | 11/2006 |

(Continued)

*Primary Examiner* — Troy Chambers
*Assistant Examiner* — Zakaria Elahmadi
(74) *Attorney, Agent, or Firm* — Cheryl F. Cohen; Christa Hildebrand

(57) ABSTRACT

The invention is directed to an actuation device for a shift-by-wire-actuated speed change gearbox. The actuation device includes an operating lever (2), a position sensor (5) and a device for haptic emulation. The haptic emulation device includes a damping element (3) which is joined (8) on the base (10) of the actuation device, as well as a motor-driven actuator (6). According to the invention, the actuation device is characterized by a spring element (4) which has a known spring rate and is disposed within the operative connection (W) between the operating lever (2), the damping element (3) and the articulated joint (8). The invention enables determination of the position of the operating lever and of the operating force applied to the operating lever by way of the spring element, using only a single position sensor. The haptic of a mechanical operating lever can be completely emulated.

9 Claims, 2 Drawing Sheets

(56) References Cited

FOREIGN PATENT DOCUMENTS

Figure 1:
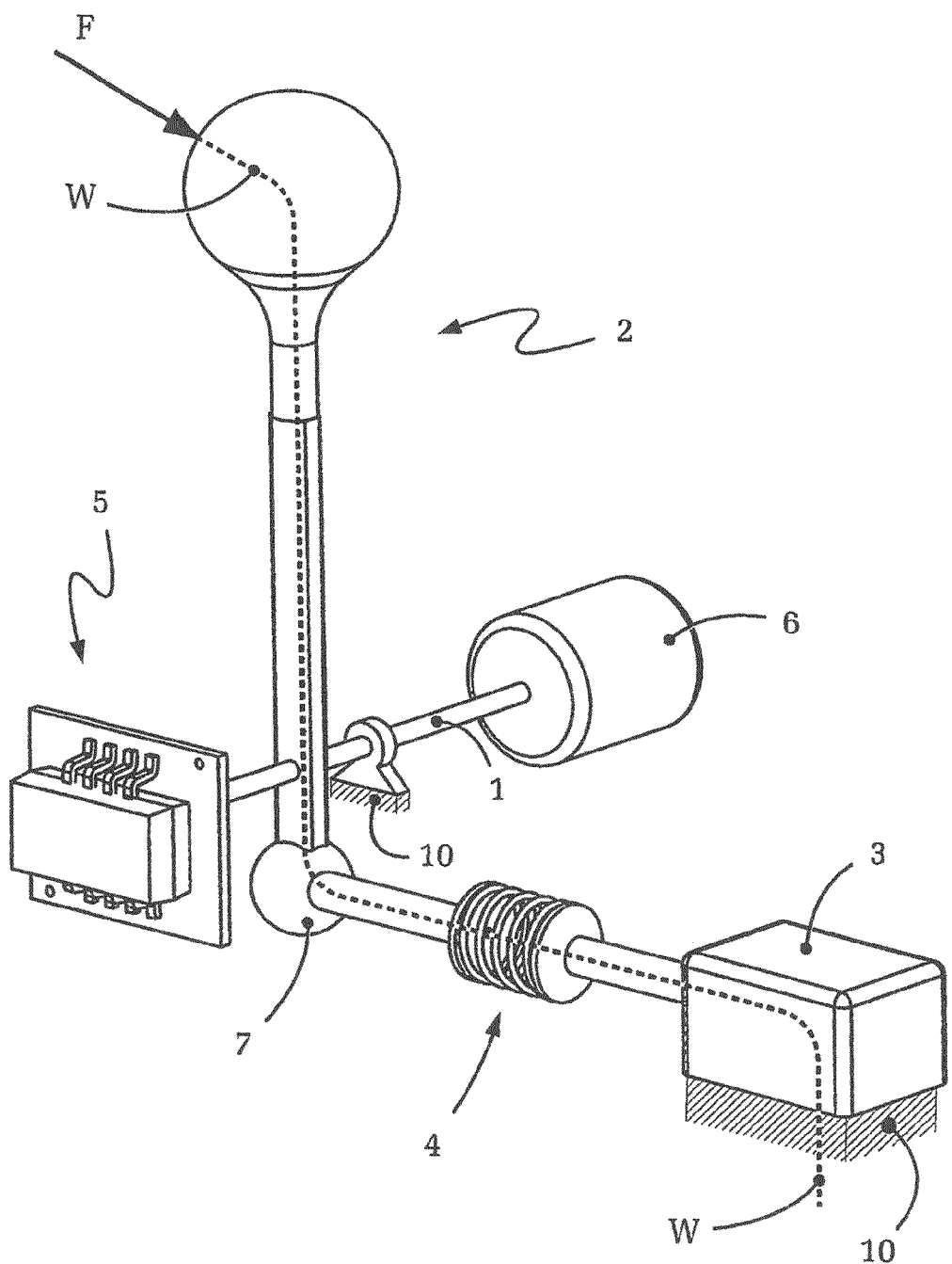

| DE | 10 2005 060 933 B3 | 6/2007 |
| EP | 1 591 697 A2 | 11/2005 |
| EP | 1 228 328 B1 | 1/2006 |
| WO | 96/42078 A1 | 12/1996 |
| WO | 00/39783 A1 | 7/2000 |

* cited by examiner

ACTUATION DEVICE WITH HAPTIC EMULATION

This is a continuation application of PCT/DE2009/000295, claiming priority to DE 102008 015 874.7 filed on Mar. 26, 2008.

BACKGROUND OF THE INVENTION (1) Field of the Invention

The invention relates to an actuation device for a shift-by-wire-actuated speed change gearbox, for example a gearbox or an automatic transmission with shift-by-wire actuation, according to the preamble of claim 1.

(2) Description of Related Art

Speed change gearboxes of automobiles are generally shifted or controlled with an actuating device arranged within the reach of the driver. Typically, actuating elements such as gear shift levers or selection levers are used, which are arranged, for example, between the front seats of the automobile or in other areas of the cockpit.

Ergonomic and safety reasons particularly require that shifting states which are currently not allowed, or the sequence of requested shifting operations are indicated to the driver via perceptible haptic signals in the form of corresponding shifting resistances and/or interlocks on the gear shift lever, similar to what a driver is used to, for example, from fully synchronized mechanical gearboxes having a rotation- and vehicle-speed-dependent synchronization interlock, or from conventional operation of an automatic transmission with its snap-in and shift interlocks.

It is therefore necessary to provide for the driver during actuation of the transmission clear haptic or tactile feedback about the actual shifting or operating state of the transmission or the success of the shifting operation.

With the electronic or shift-by-wire actuation of gearboxes, a mechanical coupling between the gear shift lever in the passenger compartment and the vehicle transmission in the engine compartment no longer exists. Instead, in a "shift-by-wire" gearbox, the shifting commands are transmitted from the actuating device to the vehicle gearbox by way of electric or electronic signals, followed by typically electro-hydraulic conversion of the switching commands on the gearbox. However, because of the missing mechanical link between the gear actuation assembly and the gear shift lever, the state of the gear, shift interlocks or prohibited shifting commands are no longer directly fed back to the state of the gear shift lever where they could be perceived by the driver.

When using shift-by-wire-controlled gearboxes, the driver is therefore unable to identify based on perceptibly blocked shifting positions on the gear shift lever that the lever positions, gear steps or shifting commands may not be allowable in the current driving state and can hence not be selected. Likewise, with shift-by-wire actuation, the execution by the transmission of the shifting commands from the driver is not fed back to the gear shift lever, so that the driver is unable to perceive haptically the course of events of the shifting operation in the same way he is used to, for example, with mechanically operated gearboxes with their snap-in and synchronization interlocks.

Depending on the state of the speed change gearbox to be operated and depending on other factors describing the state of the automobile—e.g., engine RPM, vehicle speed, clutch position and the like—it is therefore necessary for implementing the required haptic feedback in shift-by-wire-controlled transmissions to limit, delay or even entirely block the movement of the gear shift lever as well, depending on the state of the transmission, actively as well as under actuator control.

Only in this way can the driver, when he reaches for the gear shift lever, receive a haptic indication with a shift-by-wire-controlled transmission that the desired shifting operation—for example due to the actual speed of the automobile or due to a current operating state of the gearbox—is not permitted and therefore blocked. It can then also be prevented that shifting commands which can currently not be performed by the shift-by-wire transmission, but which are recognized by the transmission's electronic unit and are hence not transmitted from the actuating device to the transmission, can still be engaged on the gear shift lever.

Such actuating mechanism is also required on the gear shift lever if the driver is to experience with a shift-by-wire-controlled transmission the same haptic feedback as with a mechanically operated transmission—for example, with a manual gearbox with transfer linkage—, where engaging the individual gears on the gear shift lever generates on the gear shift lever corresponding perceptible counterforces, in particular rotation-speed or vehicle-speed-dependent counterforces.

As disclosed, for example, in DE 198 48 191 A1, attempts have been made in the state-of-the-art to implement a corresponding haptic with an actuating element for a speed change gearbox, wherein the actuating element is provided with an electronically controllable force-generating element or motion damper, which is controlled with a control device so that during actuation of the actuating element by the driver the counterforces which accompany the corresponding state changes in the speed change gearbox can be simulated on the actuating element.

For a realistic simulation of the haptic, in particular for a realistic emulation of the counterforces acting upon the gear shift lever, the control electronic of the operating lever must know at any time the state of the operating lever, i.e., its position and optionally angular velocity as well as the force actually applied on the operating lever by the driver. Conventional solutions require a first sensor which measures the position and optionally angular velocities of the operating lever, and an additional second sensor which measures the force generated by the user.

Safety requirements against system failure may make it necessary to implement these two sensors, which are essential in the state-of-the-art, in duplicate or triplicate. State-of-the-art systems therefore have substantial design complexity and correspondingly high costs due to the large number of required sensors.

BRIEF SUMMARY OF THE INVENTION

With this in mind, it is an object of the present invention to provide an actuating device with a device for emulating the haptic for the operating lever—in particular for electric and/or electronic shift-by-wire actuation of a speed change gearbox—which are able to overcome the aforementioned disadvantages of the state-of-the-art. The actuating device should have a simple structure and low manufacturing costs while allowing a reliable and accurate determination of the operating forces acting on the operating lever. Moreover, a reliable and realistic emulation of the haptic of a mechanical snap-in operating lever should be possible.

The object is attained with an actuating device having the features of claim 1.

Preferred embodiments are recited in the dependent claims.

In an essentially conventional manner, the actuating device according to the present invention includes an operating lever with a sensor for determining the actual position of the operating lever. In an also essentially conventional manner, the actuating device further includes a device for emulating the haptic, which has a controllably adjustable electro-rheological or magneto-rheological damping element which is connected with the operating lever, and a motor-driven actuator.

According to the invention, however, the actuating device is characterized in that—for determining with the position sensor the operating force exerted on the operating lever—a spring element with a known spring constant is arranged at an initially arbitrary location within the operative connection for the operating force between the operating lever, the adjustable damping element and the joint of the damping element on the base of the actuating device.

Since the spring element is located inside the aforementioned operative connection and its spring constant is known, a single position sensor disposed in the actuating device is already sufficient according to the invention for determining both the current position of the operating lever and the operating force applied on the operating lever by the operator. The term "at an arbitrary location within the operative connection" is meant to indicate that for implementing the invention, it is initially unimportant if the spring element is arranged in the region of the connection between the operating lever and the adjustable damping element, in the region of the connection between the adjustable damping element and its joint with the base of the actuating device, or at any desired location between these two connections.

According to the invention, the operating force applied on the operating lever is determined with the position sensor by registering with the position sensor a compression or expansion of the spring element as soon as an operating force is applied on the operating lever by the operator. Accordingly, a position sensor connected with the operating lever can thereby register a corresponding (small) movement of the operating lever caused by the operating force. The magnitude of the force applied on the operating lever can then be determined from the magnitude of this force-induced movement of the operating lever with the known spring constant of the spring element.

Depending on the magnitude of the operating force applied on the operating lever by the operator, the damping element can be, for example, controlled by the control electronics of the actuating device, allowing the operator to perceive the desired realistic counterforce when initiating the movement of the operating lever—commensurate with overcoming a real snap-in. In this way, the haptic known from a mechanical snap-in operating lever can be largely realistically simulated or emulated—with only the arrangement of the position sensor, the spring element and the adjustable damping element.

The operating lever may be either an operating lever with stable lever positions which snaps-in between at least two shifting positions, or a monostable operating lever which returns again to a neutral center position after each actuation.

Using an electro-rheological or magneto-rheological damping device makes it possible to generate almost any type of counterforces, optionally including controlled blocking of the damping element and hence the operating lever, with minimum energy consumption and hence minimum current consumption and minimum heat generation. Another advantage of using an electro-rheological or magneto-rheological damping device is the practically wear-free and delay-free adjustability of the damping element characteristic, which can also facilitate a realistic simulation of the haptic of a mechanical operating lever.

The invention can initially be implemented and arranged independent of the actual construction of the spring element, as long as it is ensured that the required small movement of the operating lever is due to a corresponding compression of the spring element when forces applied on the operating lever. According to a preferred embodiment of the invention, the spring element is formed by an elastomer element, for example an O-ring.

In this way, a particularly cost-effective and space-saving realization and arrangement of the spring element can be attained, for example by arranging the spring element or the O-ring at an arbitrary location within the operative connection between the operating lever and the controllable damping element—or the attachment of the damping element on the housing base of the actuating device, respectively.

According to another preferred embodiment of the invention, the spring element is arranged in the region of an articulated joint of the operating device, or forms a component of an articulated joint of the operating device.

This results in a particularly simple structure, because a structurally separate spring device is not required. Instead, one of the articulated joints of the actuating device is simply suitably elastically formed—for example by integrating the spring element which is preferably formed as an elastomer element into the articulated joint itself. In this way, for example, the joint of the adjustable damping element with the housing base, or the connection of the adjustable damping element with the operating lever can be used for accommodating the spring element.

According to a preferred embodiment of the invention, the adjustable damping element is configured—by using characteristic control curves—to exclusively generate counterforces against the manual forces applied by the operator. Conversely, the motor-driven actuator is configured—also by using the characteristic control curves—exclusively for actuated movement of the operating lever. Accordingly, based on the characteristic control curves, there is a defined and exact separation of tasks between the damping element and the motor-driven actuator such that forces are exclusively generated by the damping element and movements are exclusively generated by the motor-driven actuator.

Unlike in the state-of-the-art, the actuator is then—like a force feedback—no longer used for generating a force, but is exclusively used for actuated movement of the operating lever. The haptic of a mechanical operating lever can thereby be very realistically and completely simulated and emulated. In particular, by combining the adjustable damping element with the actuator, the haptic of a mechanical snap-in can also be realistically emulated, without actually requiring a mechanical snap-in. The adjustable damping element is hereby specifically and exclusively responsible for generating realistic counterforces of the snap-in of the operating level or the transmission, whereas the actuator is responsible specifically and exclusively for the realistic spring-back of the operating lever into the recesses of the virtual snap-in shift gate.

This is also particularly advantageous because energy consumption for the actuator mechanism and the haptic emulation of an operating lever can be minimized, while the size of the actuator can also be minimized. Because different from the state-of-the-art, the actuator is used only for generating movements of the operating lever, but not for generating noticeable counterforces, because any counterforces against the operating forces applied by the operator can be wholly generated by the controllable damping element.

As soon as the operator stops to apply noticeable operating forces on the lever, the control of the damping element can be instantaneous switch to the motor-driven actuator by the controller and the stored characteristic curve field, wherein the motor-driven actuator can simulate the return of the operating lever into the closest recess of the (in reality nonexistent) snap-in shift gate of the transmission and/or the actuating device. The damping element can generate the optionally required deceleration forces as well as the motion damping until the operating lever comes to rest, when the operating lever returns into the recess of the virtual snap-in shift gate.

Such complete emulation not only of the haptic of the shifting resistances of a snap-in shift gate, but also of the spring-back movements of the selection lever into the recesses of the snap-in shift gate, represent a significant advantage and a significant novel aspect of the invention.

In this way, for example, an operating lever may be provided with variable snap-in, whereby not only the stiffness of the latching, but also the number of latching recesses and their mutual spacing can be adjusted freely and variably—with software, for example by selecting a corresponding characteristic curve field for controlling the damping element and the motor-driven actuator. For example, the number of latching points as well as their mutual spacing and stiffness can be adjusted with software commensurate with the preference of the respective driver. Either the damping element for generating counterforces (as long as the operator applies manual forces on the lever) or the motor-driven actuator (as soon as the user no longer applies a noticeable manual force on the lever and the lever must therefore return into its attached position) can be controlled by using the stored characteristic curve field.

In this way, the driver can be presented, according to desire or preference, at one time with the haptic of a mechanically actuated speed change gearbox and another time with the haptic of an automatic transmission or a continuous transmission. For a possibly required realization of several shift channels of a selection lever or shifting lever, the arrangement of adjustable damping element, actuator and spring element can be implemented multiple times, for example along two perpendicular movement axes of an operating lever.

The invention can be implemented independent of the structural design and the arrangement of the actuator. In particular, with the invention and the possible reduction in the size of the actuator, a gearless actuator may be employed which directly drives the operating lever. Alternatively, the actuator may be implemented as a DC motor with or without brushes, and a stepper motor may also be employed.

According to a preferred embodiment, the actuator of the actuating device is a geared electric servo motor, wherein the operating lever is preferably coupled directly to the driveshaft of the actuator. In this way, a particularly space-saving, robust and cost-effective structure is obtained. Because the actuator is responsible only for the movement or the actuator-driven return of the operating lever into the (virtual) recesses of the snap-in shift gate, whereas the task of generating counterforces can be assumed exclusively by the controlled damping element, a relatively small and lightweight actuator can be employed, with a shaft that can also directly act upon the operating lever.

The invention will now be described with reference to the drawings which only illustrate exemplary embodiments.

BRIEF DESCRIPTION OF THE SEVERAL VIEWS OF THE DRAWING(S)

Figure 2:
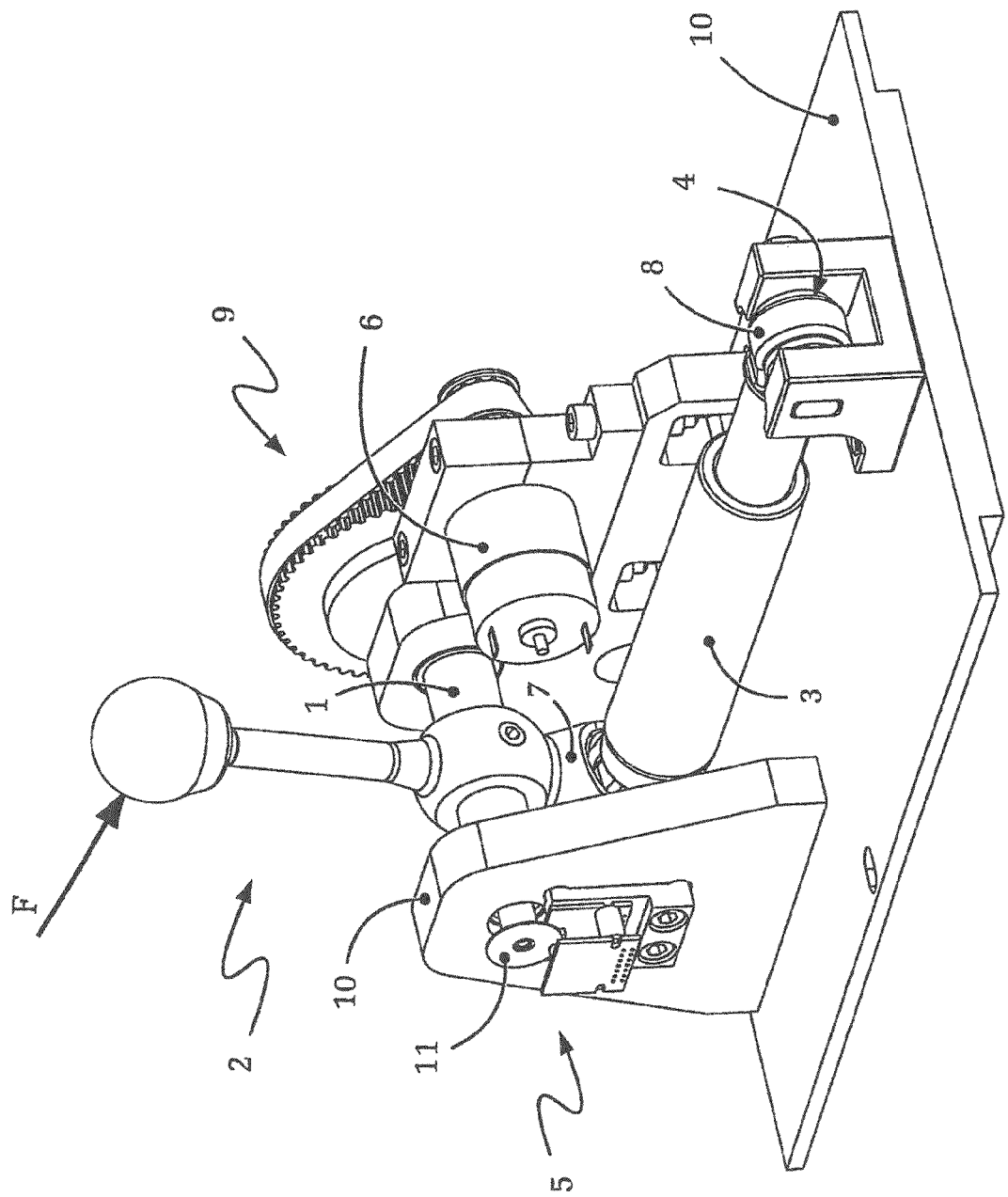

FIG. 1 illustrates in a schematic isometric view the operating principle of an embodiment of the actuating device according to the present invention with adjustable damping element and actuator; and FIG. 2 illustrates in an isometric view another embodiment of an actuating device according to the invention.

DETAILED DESCRIPTION OF THE INVENTION

FIG. 1 shows schematically in an isometric view the operating principle of an operating device according to the present invention, with adjustable damping element and actuator.

First, an operating lever 2 supported on a shaft 1 is illustrated. Also visible is a schematically illustrated adjustable damping element 3, a spring element 4 arranged between the adjustable damper 3 and the selection lever 2, as well as a position sensor 5 and an actuator 6, wherein the position sensor 5 and the actuator 6 are directly connected with or directly interact with a shaft 1 of the operating lever 2. The shaft 1 is connected via a bearing with the base 10 (indicated by crosshatching) of the actuating device. The also existing connection of the actuator 6 with the base 10 of the actuating device is—for sake of clarity—not illustrated in the schematic representation of FIG. 1.

The adjustable damper 3 and the spring element 4, respectively, are connected via a schematically indicated joint 7 with the operating lever 2, wherein the adjustable damper 3 is also joined to or attached on the base 10 of the actuating device.

The embodiment illustrated in FIG. 1 has hence both an actuator 6 and a combination of a spring element 4 and a position sensor 5 with dual-use according to the invention.

In the illustrated embodiment, initially the instantaneous position and/or angular velocity of the operating lever 2 about the shaft 1 as well as the operating force F exerted by the driver on the operating lever 2 can be determined using only the single position sensor 5. As soon as the driver applies a force F on the operating lever 2, the spring element 4 experiences a slight compression or expansion—depending on the direction of the force. This compression or expansion of the spring element 4 is transmitted via the shaft 1 also to the position sensor 5, so that the magnitude of the operating force F applied to the operating lever 2 can be determined from the sensor signals of the position sensor 5 and from the known spring constant of the spring element 4. With the invention, a separate sensor for determining the forces applied on the operating lever 2 can hence be eliminated.

The embodiment of the actuating device illustrated in FIG. 1 has in addition to the position sensor 5 and the adjustable damper 3 also a motor-driven actuator 6 for actuated movement of the operating lever 2. The haptic of a mechanical activating device for a transmission can hereby be completely emulated, including snap-in in an existing snap-in device in a mechanically operated gearbox or in a mechanical actuating device.

The adjustable damper is responsible for simulating the counterforces generated by the snap-in device or by the transmission—optionally including blocking of the operating lever 2 with impermissible shifting commands. However, the motor-driven actuator 6 only becomes active when the operating lever 2 must be moved without the driver having applied forces on the operating lever 2. This is particularly the case when the lever 2 is released while the lever 2 is still not exactly in a (virtual) snap-in position. In this case, the actuator 6 is controlled by the control electronics of the actuating device so that the operating lever 2 is returned by the actuator 6 to the center of the corresponding virtual snap-in position. In this way, the operator or driver is presented exactly with the behavior of a mechanical snap-in operating lever, although mechanical snap-in is actually nonexistent.

The actuator 6 can also be used to track the operating lever 2 in the correct shifting position, if there is a discrepancy between the shifting position of the operating lever 2 and the actual shifting state in the transmission. This may be the case, for example, if a parking lock was automatically set in the transmission via Auto-P, for example, when the ignition key is removed or when exiting the automobile, if the driver forgets to manually apply the parking lock. In this situation, the operating lever 2 can be automatically moved by the actuator to the parking lock position, so that the position of the selection lever is automatically in agreement with the parking lock applied in the transmission upon return to the automobile, even when the selection lever was previously left by the driver in one of the drive positions.

The embodiment illustrated in FIG. 1 is also suitable for emulating the haptic of a monostable operating lever. In this case, the combination of adjustable damper 3 and actuator 6 produces, on one hand, a realistic simulation of the snap-in and optionally shift interlocks or shifting resistances in the transmission. On the other hand, the actuator 6 can also be used to return the operating lever 2 again into the neutral position, after excursion from neutral position and after being released.

FIG. 2 shows an embodiment of an actuating device according to the present invention which is essentially identical with the illustration in FIG. 1 with respect to its operating principle.

Also illustrated is here an operating lever 2 supported on a shaft 1, as well as an adjustable damper 3, a position sensor 5 and an actuated drive 6. Unlike in the schematic embodiment illustrated in FIG. 1, the actuated drive 6 in the embodiment of FIG. 2 includes a belt drive 9 as transmission which, however, is not significantly different from the actuating device of FIG. 1.

The embodiment of FIG. 2, however, is different from the schematic illustration of FIG. 1 in particular with respect to the arrangement and implementation of the spring element 4. In the embodiment of FIG. 2, the spring element 4 is integrated in the articulated joint 8 which connects the adjustable damper 3 with the base plate 10 of the actuating device. In the simplest case, the spring element 4 is hence installed in the articulated joint 8 only in form of a residual elasticity with a known spring constant, for example in form of an elastomer layer between the outer ring and the inner ring of the articulated joint 8. Alternatively and with the same effect, the spring element 4 can also be integrated, for example, in the articulated joint 7.

When in the embodiment of FIG. 2, the driver applies an operating force F on the operating lever 2, then this causes via the articulated joint 7 and the (initially rigidly switched) adjustable damper 3 a corresponding small excursion of the outer ring of the articulated joint 8 with respect to the attachment of the articulated joint 8 on the base plate 10, caused by the corresponding compression of the spring element 4 installed in the articulated joint 8. This excursion in the articulated joint 8 propagates again backwards through the damper 3 and the articulated joint 7 to the operating lever 2 which correspondingly experiences a small excursion which is barely perceivable by the operator. This excursion of the operating lever 2 causes a corresponding slight rotation of the shaft 1 and commensurately also a rotation of the sensor disk 11 of the position sensor 5. This rotation of the sensor disk 11 is then registered by the evaluation circuit of the position sensor 5, whereafter the magnitude of the force applied on the operating lever can be determined based on the magnitude of the excursion of the operating lever 2 and based on the known spring constant of the spring element 4.

Of course, the force F applied on the operating lever 2 in a non-rigidly switched damper 3—in other words, with a simultaneous pivoting motion of the operating lever 2—can also be determined. However, in this case, the compression of the spring element 4 need no longer be measured, because the magnitude of the force F applied on the operating lever 2, when the operating lever 2 is simultaneously moved, can already be determined based on the movement velocity of the operating lever as well as based on the known characteristic curve and the known operating point of the adjustable damper 3.

Like in the embodiment of FIG. 1, the actuator 6 in the embodiment of FIG. 2 provides again an extremely realistic emulation of the haptic of a snap-in operating lever 2, with the actuator 6 simulating the spring-back of the operating lever 2 into the respective latching positions of a (nonexistent) snap-in shift gate.

As a result, it becomes clear that with the invention and actuating device with haptic emulation for a shift-by-wire-operated speed change gearbox is provided, which initially has the particular advantage of that both the position (and optionally also be movement velocity) as well as the operating force applied on the operating lever can be determined with only a single sensor.

In this way, the number of required sensors for reliably determining the state of an operating lever can be cut in half compared to the state-of-the-art, producing a correspondingly simpler structure and lower costs. In addition, with the invention, the behavior of a mechanical snap-in operating lever is faithfully presented to the driver, although a mechanical snap-in is no longer present. Moreover, this virtual snap-in can be freely and controllably varied both with respect to the number and the spacing of the snap-in points as well as with respect to the stiffness of the snap-in. It then becomes possible to change the entire haptic and the entire movement characteristic of an actuating device for a speed change gearbox over wide ranges exclusively with software and to adapt them to user preferences. Even purely software-controlled shifting of the haptic of an actuating device between an automatic selection lever and a gear shift lever for a classic gearbox can be realized.

The invention therefore contributes fundamentally to improvements of the ergonomics, the operating comfort, the installation space and cost-effectiveness, in particular for high-end applications in the field of operating the transmission of automobiles, and presents an essential step towards replacing complex mechanical components with software.

LIST OF REFERENCES SYMBOLS

1 Shaft
2 Operating lever
3 Adjustable damping element
4 Spring element
5 Position sensor, rotation angle sensor
6 Motor-driven actuator
7, 8 (Articulated) joint
9 Belt drive
10 Base, base plate
11 Sensor disk
F Operating force
W Operative connection for the operating force

What is claimed is:

1. An actuation device for selecting shifting steps for a shift-by-wire-actuated speed change gearbox, the actuation device comprising:

an operating lever (2) with a position sensor (5) for determining the position of the operating lever (2);

a device for haptic emulation, wherein the haptic emulation device comprises an adjustable electro-rheological or magneto-rheological damping element (3) which is connected to the operating lever (2) and joined (8) to a base (10) of the actuation device, a spring element (4), which is disposed within an operative connection (W) between the operating lever (2), the adjustable damping element (3) and the joint (8) of the adjustable damping element (3) and which has a known spring rate, for determining the operating force (F) applied to the operating lever by way of the position sensor (5), and wherein the adjustable damping element (3) is configured based on characteristic control curves exclusively for generating counterforces, whereas a motor-driven actuator (6) is configured based on the characteristic curves exclusively for actuating movement of the operating lever (2) to stimulate and emulate the haptic of a mechanical operating lever.

2. The actuation device according to claim 1, wherein the spring element (4) is formed by an elastomer element.

3. The actuation device according to claim 1, wherein the spring element (4) is formed by an O-ring.

4. The actuation device according to claim 1, wherein the spring element (4) is arranged in a region of a joint (8) of the actuation device.

5. The actuation device according to claim 4, wherein the actuator (6) is an electric servo-gear-motor.

6. The actuation device according to claim 4, wherein the operating lever (2) is directly connected to the shaft of the actuator (6).

7. The actuation device according to claim 1, wherein the operating lever (2) is not mechanically coupled to a vehicle transmission.

8. The actuation device according to claim 1, wherein the shift-by-wire-actuated speed change gearbox is for selecting a gear of an automobile.

9. The actuation device according to claim 1, wherein the position of the operating lever (2) is determined using a single position sensor (5).

* * * * *